United States Patent
Croset et al.

[11] 3,825,318
[45] July 23, 1974

[54] WAVEGUIDE COUPLER HAVING TRANSPARENT STRATIFIED STRUCTURE WITH PARALLEL FACES

[75] Inventors: Michel Croset; Gonzalo Velasco, both of Paris, France

[73] Assignee: Thomson-CSF, Paris, France

[22] Filed: Aug. 10, 1972

[21] Appl. No.: 279,361

[30] Foreign Application Priority Data
Sept. 16, 1971 France .................... 71.33389

[52] U.S. Cl. ......... 350/96 WG, 65/DIG. 7, 204/298, 350/175 GN
[51] Int. Cl. .................................... G02b 5/14
[58] Field of Search ............... 350/96 WG, 175 GN

[56] References Cited
UNITED STATES PATENTS
3,212,401  10/1965  Navias.................. 350/175 GN UX
3,284,722  11/1966  Gray..................... 350/175 GN UX
3,674,337  7/1972  Marcatili..................... 350/96 WG OTHER PUBLICATIONS
Hensler et al. "Optical Propagation in Sheet and Pattern Generated Films of $Ta_2O_5$," Applied Optics Vol. 10, No. 5, May 1971, pp. 1037–1042.

*Primary Examiner*—John K. Corbin
*Attorney, Agent, or Firm*—Cushman, Darby & Cushman

[57] ABSTRACT

An optical structure with parallel faces, has a refractive index decreasing continuously from one face to the other.

The structure is produced by reactive cathode sputtering of tantalum in the presence of oxygen. It makes it possible, by refraction, to render parallel light rays which enter at varying angles of incidence.

5 Claims, 5 Drawing Figures

WAVEGUIDE COUPLER HAVING TRANSPARENT STRATIFIED STRUCTURE WITH PARALLEL FACES

The present invention relates to an application of the principle of producing deposits under vacuo.

This principle is as follows:

In an evacuated enclosure, by a cathode-sputtering or by vaporisation, for example, a stream of particles of an element A is produced, and these deposited upon a substrate.

If, during operation, there is simultaneously condensed upon the same substrate an element B capable of reacting with the element A to produce a chemical compound $A_M B_N$, then it is possible in a large number of cases and by controlling the stream of particles B striking the substrate in relation to the stream of particles A, a deposit whose chemical composition is non-stoechiometric, varies between A and $A_M B_N$. It is thus possible, by regulating the stream of particles B, to produce a deposit whose refractive index varies between $N_o$, the index of A, and $N_o$ the index of the stoechiometric coumpound $A_M B_N$. The controllable flow of particles B can be obtained either, if F is gaseous, by introducing the gas B into the enclosure at a partial pressure, or, as in the case with the stream of particles A, by cathode-sputtering or by thermal vaporisation.

The invention relates a non-homogeneous plate with parallel transparent faces whose effective index at a given point is a predetermined function of the distance Z of said point to one of the faces of the plate, and the invention likewise relates to possible applications of this kind of structure.

The invention will be better understood from a consideration of the ensuing description and by reference to the attached drawings in which:

FIG. 1 shows a cathode-sputtering apparatus, which will enable the structure in accordance with the invention to be produced.

Figure 1:
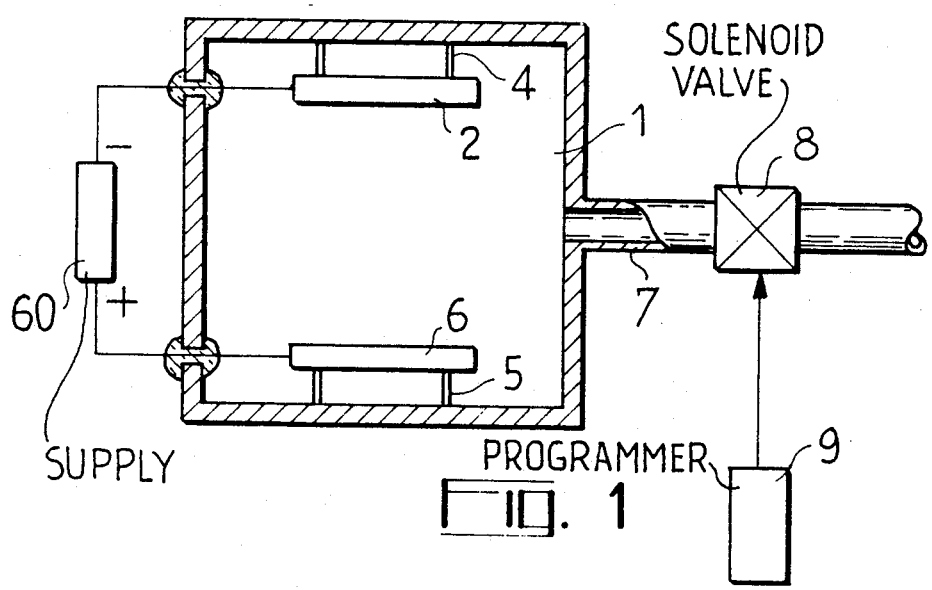
FIG. 1 is a schematic view of a cathode-sputtering device for producing a structure in accordance with the invention.

It comprises a sealed enclosure 1. In this enclosure there are arranged a cathode 2 made of the element which is to be atomised, and a metal anode 6 upon which the deposit is produced. The cathode is fixed to the enclosure by pillars 4.

The anode 6 is attached to the enclosure by insulators 5. A d.c. supply 60 has its negative terminal connected to the cathode and its positive terminal to the anode.

The enclosure contains an inert gas, for example argon, at a very low pressure.

A pipe 7 containing a solenoid valve 8, is used to introduce the reactive gas. This solenoid valve is controlled by a programmer 9.

The operation of the system is as follows:

The programmer 9, as a function of time, causes the flow rate across the solenoid valve to vary in order, during the atomising time, to obtain a continuously rising pressure in the reaction gas, from P1 to P2 at the end of the atomising operation, these two pressures being lower than the pressure $P_o$ required for the stoechiometric compound.

By way of example, the element to be atomised is tantalum and the reactive gas oxygen.

Figure 2:
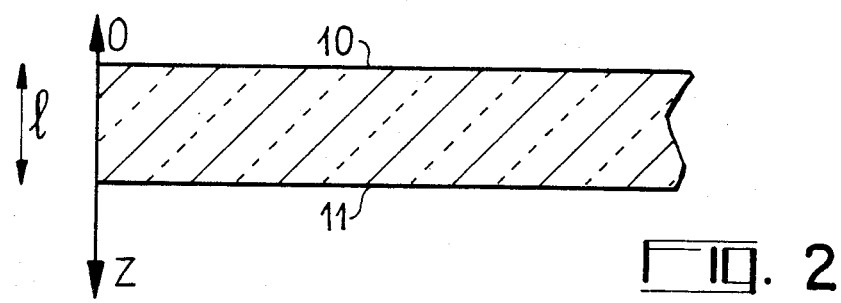
FIG. 2 illustrates the structure in accordance with the invention.

The structure obtained is shown in FIG. 2. This is a stratified structure composed of a mixture of tantalum and tantalum oxide. It takes the form of a wafer with parallel faces, with two terminal faces 10 and 11. It has the following optical property:

Its refractive index is not constant throughout the thickness of the layer but is a function of the coordinate Z, perpendicular to the faces whose origin is a point 0 on one of the terminal faces.

In the case of tantalum, and taking an oxygen partial pressure P which rises from $P_1$ to $P_2 < P_o$, the refractive index varies from $n_1$ to $n_2$, decreasing as the proportion of tantalum in the deposited mixture decreases, the refractive index of tantalum $n_o$ being equal to 3.3 and that of tantalum oxide $N_o$ being equal to 2.2.

Figure 3:
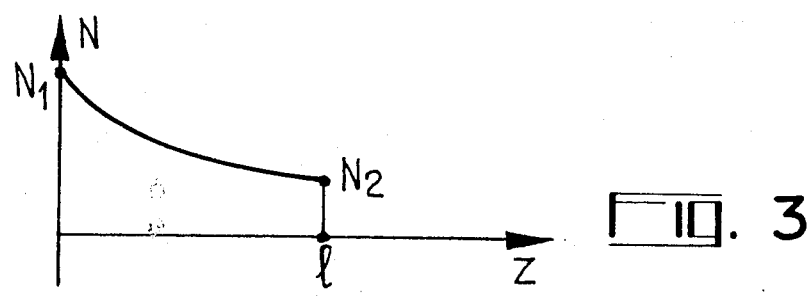
FIG. 3 is an explanatory graph.

The variations in N as a function of Z have been shown in FIG. 3. N varies from a value $N_1$ for $Z = 0$, to a value $N_2$ for $Z = 1$, 1 being the thickness of the wafer, which is of the order of 1 to 10 microns.

If $P_1$ is equal to 0, then $N_1 = n_o$ and if $P_2 = P_o$, then $N_2 = N_o$. The maximum range of variation is thus from 3.3 to 2.2. In reality, $P_1$ is close to $P_o$, tantalum not being transparent to visible light whilst tantalum oxide is.

A wafer produced by this method is of considerable interest in the design of a device for coupling a light source to an optical waveguide, for example a set of glass fibres.

Those skilled in the art will be well aware that waveguides of this kind are tubes of very small transverse dimensions, although large compared with the wavelength to be transmitted, and that they will only transmit light without any appreciable loss if, at their input, the light rays are substantially parallel to their axis. Hitherto, it has been difficult to ensure coupling of a light source to this kind of waveguide, under correct conditions.

Figure 4:
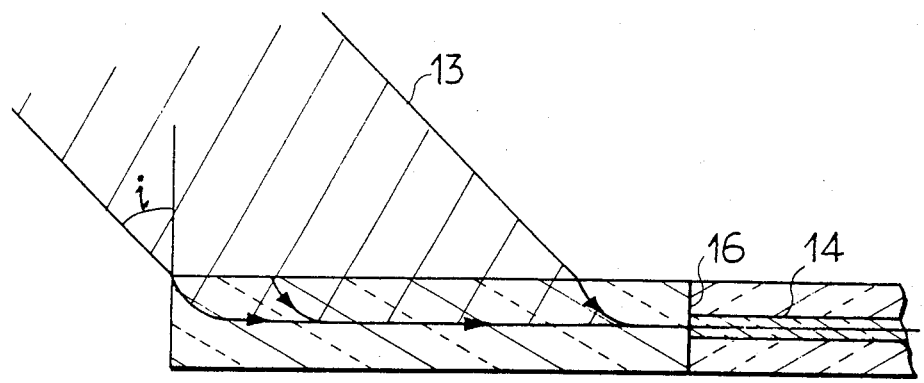
FIG. 4 illustrates an example of a device utilising a structure of FIG. 2.

The device shown in FIG. 4 enables this difficulty to be resolved.

The light source, not shown, will for example be a laser emitting a beam of strictly parallel light rays 13.

These rays all arrive at the face 11 with the same angle of incidence i. They penetrate the layer after having experienced refractions; the refraction angle is given by the relationship $\sin i = n_1 \sin r$.

Then, as they penetrate through the wafer, the refraction angle increases since they are encountering layers of decreasing refractive index, and this continues until, at a penetration depth which is the same for all the rays, they are parallel to the axis of the wafer. All the rays have thus followed optical trajectories of the same length and their trajectories are derived from one another by translations parallel to the longitudinal axis of the wafer.

The optical fibre 14 is then applied on the terminal face 16 of the wafer, parallel to its axis, in the region where the parallel light rays refracted by the wafer are concentrated. This fibre is for example made of tantalum oxide.

Figure 5:
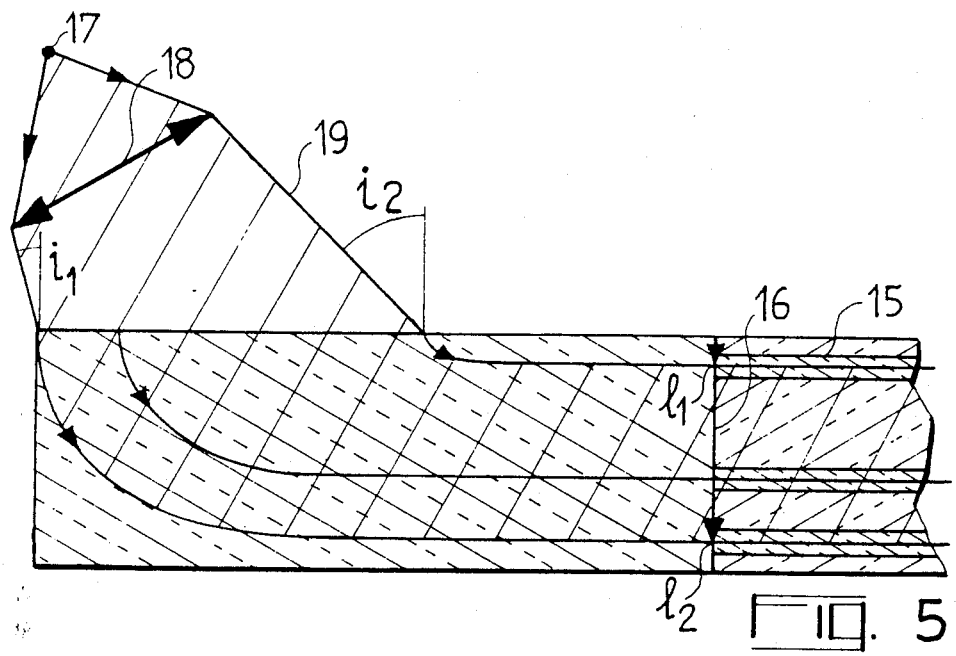
FIG. 5 is a variant embodiment of the device shown in FIG. 4.

If it is not merely one optical fibre but a bunch of parallel fibres which are to be excited, then the variant embodiment shown in FIG. 5 can be adopted.

In this device, a bunch of optical fibres 15 is arranged at the output of the wafer.

A lense 18 produces from a point source 17, a bunch of divergent light rays 19, the angles of incidence of the extreme rays $i_1$ and $i_2$ respectively, where $i_2 > i_1$.

The ray having an angle of incidence $i_1$ enters the wafer at an angle approaching the normal and in fact at an angle $r_1$ which is smaller than the angle $r_2$ of penetration of the ray $i_2$. It deviates from the normal as it continues its penetration, in accordance with the mechanism indicated hereinbefore, and becomes parallel to the wafer axis at a certain depth $1_1$.

The ray whose angle of incidence is $i_2$, will be parallel to the axis at the depth $1_2 > 1_1$. All the rays will be concentrated at the output of the wafer, in the region comprised between the ordinate values $1_2$ and $1_1$.

These optical fibres, arranged opposite said region, receive the light rays at the appropriate angle of incidence.

What we claim is:

1. A transparent stratified structure with parallel faces, comprising layers of a mixture of one chemical element, and of a chemical combination of said one element with another chemical element, the proportions of said one element in said mixture decreasing continuously from the one face to the other, in the same fashion as the refractive index thereof, comprising a flat end face perpendicular to the two parallel faces, and an optical device for directing onto said face having the highest refractive index a light beam, a waveguide having an axis perpendicular to said end face, being joined thereto, in order to receive the rays refracted in said structure, after they have acquired a direction parallel to said axis.

2. A structure as claimed in claim 1, wherein said other element is a gas.

3. A structure as claimed in claim 1, wherein said element is tantalum and the combination tantalum oxide.

4. A structure as claimed in claim 1, wherein the illuminating device produces parallel rays.

5. A structure as claimed in claim 1, wherein the illuminating device produces a beam of divergent light rays.

* * * * *